June 1, 1965 T. HAFNER 3,187,279

HEATING MEANS FOR SURFACE WAVE CONDUCTORS

Filed Dec. 28, 1964 2 Sheets-Sheet 1

INVENTOR
THEODORE HAFNER

June 1, 1965 T. HAFNER 3,187,279

HEATING MEANS FOR SURFACE WAVE CONDUCTORS

Filed Dec. 28, 1964

2 Sheets-Sheet 2

INVENTOR
THEODORE HAFNER

United States Patent Office 3,187,279
Patented June 1, 1965

3,187,279
HEATING MEANS FOR SURFACE WAVE CONDUCTORS

Theodore Hafner, 265 Riverside Drive, New York, N.Y.

Filed Dec. 28, 1964, Ser. No. 421,540
11 Claims. (Cl. 333—95)

This invention relates to surface wave transmission lines, and more specifically to surface wave conductors containing several wires insulated from each other.

This is a continuation-in-part of Serial No. 250,284, filed on January 9, 1963.

One of the objects of the invention is to provide a surface wave conductor permitting simultaneous transmission of surface wave currents in the operating frequency range of the surface wave conductor, and other currents of substantially lower frequency range, such as A.C. and D.C. current for other purposes, such as providing current supply for de-icing or for repeater feeding.

Another object of the invention is to provide around a surface wave conductor consisting of one or several wires surrounded by a dielectric coating producing the field concentration required for surface wave propagation, another conductor surrounding, embedded in, or adherent to the dielectric of the first conductor in such a manner as not to affect or impair surface wave propagation, while at the same time satisfying additional or specific current supply needs in accordance with the invention.

A more specific object of the invention is to surround a surface wave conductor with a conductor spiral of such dimensions and pitch as not to affect surface wave propagation, and at the same time to provide current supply, especially for de-icing or repeater feeding, or for both these purposes simultaneously.

In a more specific embodiment of the invention, the conductive spiral is arranged in a groove or grooves formed or cut into the dielectric coating of the surface wave conductor.

In another embodiment of the invention, the conductor spiral is moulded into the dielectric coating of the surface wave conductor, preferably close to its surface so as to provide the proper heat distribution for the specific purpose in accordance with the invention, such as especially de-icing and repeater feeding.

In a further embodiment of the invention, a surface wave conductor consisting of a wire surrounded by a dielectric coating is provided with an additional conductor spirally surrounding the dielectric coating, preferably closely adherent thereto or embedded therein and of a thickness which is small against the thickness of the surface wave conductor wire itself, and wound at a pitch providing a space between the conductor windings which is substantially larger than the thickness of the conductor, and not too small against operating wave length, for example not smaller than $1/100$ of operating wave length.

In a further specific embodiment of the invention, in the UHF frequency range, and especially at a frequency range of the order of 800 m.c., and with a surface wave conductor wire of 0.162 inch diameter (# 6), the conducting spiral wound around the dielectric coating, which is preferably of an outer diameter of 0.4 inch, consists of copper with a diameter of approximately 0.06 inch (# 16) and wound at a pitch of 0.2 inch.

Still another embodiment of the invention provides a conductor winding around the dielectric coating of the surface wave conductor consisting of springy material, for example containing bronze or beryllium or both, so that during winding the outer conductor winding is forced under tension closely to adhere to the dielectric coating which is also compressed by the winding and after release of the winding tension will force by expansion a close adherence of the outer conductor winding to the dielectric coating, thereby preventing relative displacement of the outer conductor windings on the dielectric coating and any interference of the outer conductor winding with the surface wave field propagation.

Generally, and as another object of the invention, the spacing between the windings of the outer spiral should be large enough to permit surface wave propagation, or not to substantially impair surface wave propagation in the operating frequency range of the surface wave conductor.

More specifically, such spacing should be at least of the order of one-hundredth of a wave length, while the diameter of the wire should be of the order of not more than two-hundredths of a wave length.

Alternatively, the spacing should be at least equal to the thickness of the spiralled wire, and preferably not less than one-hundredth of operating wave length.

Still further as an object of the invention is to provide fixation of the outer spiral by the addition of a thin dielectric layer or tape applied or wound around the spiralled wire, for example Mylar tape, so as to effect the required physical attachment of the outer conductor to the dielectric coating without affecting or impairing surface wave propagation.

These and other objects of the invention will be more fully apparent from the drawings annexed herewith in which.

Figure 1:
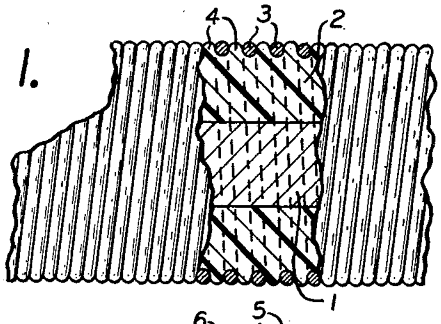
FIG. 1 represents a surface wave conductor including a de-icing winding in a longitudinal view partly in cross section.
Figure 2:
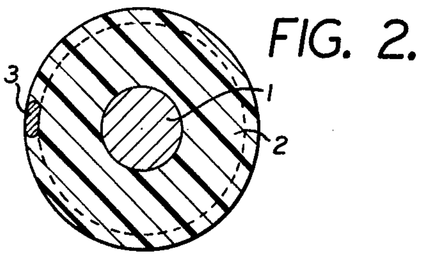
FIG. 2 represents a corresponding cross section in a direction perpendicular to the longitudinal axis of the surface wave conductor shown in FIG. 1.
Figure 3:
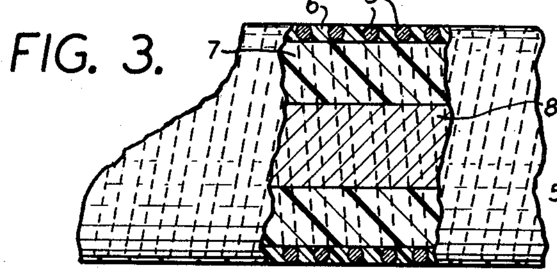
Figure 4:
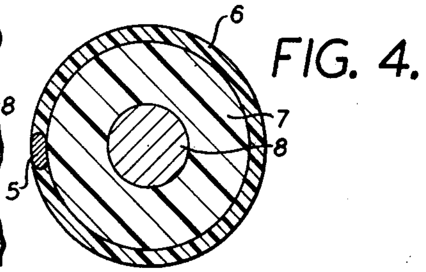

FIGS. 3 and 4, in longitudinal and perpendicular cross sections, respectively, represent a modification of the embodiment shown in FIGS. 1 and 2.

Figure 5:
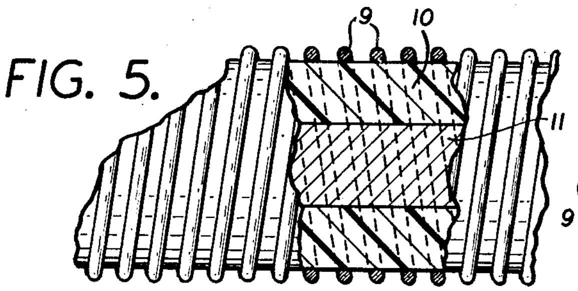
Figure 6:
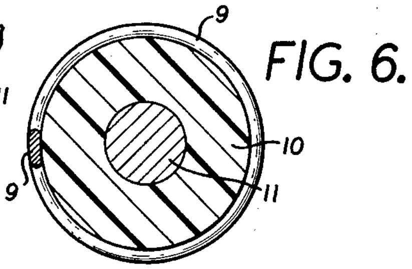

FIGS. 5 and 6, also in longitudinal and perpendicular cross sections, respectively, represent another modification of the invention, using as another example of the invention another type of attachment of an outer conductor.

Figure 7:
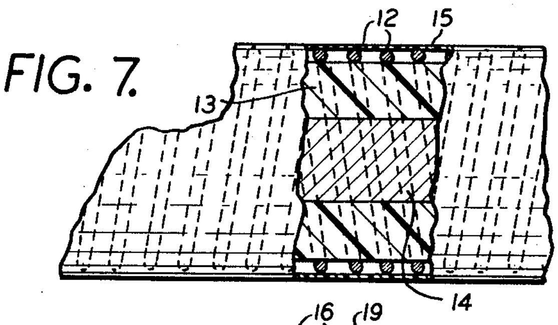
Figure 8:
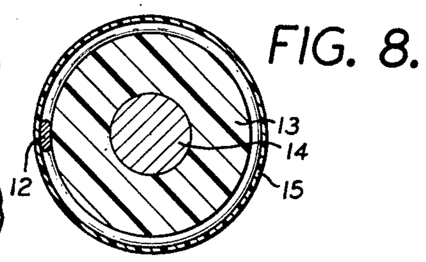

FIGS. 7 and 8, corresponding to those of FIGS. 1 and 2, 3 and 4, and FIGS. 5 and 6, respectively, represent a modification of the embodiment of FIGS. 5 and 6, and which may also be applied to the embodiments shown in the preceding figures.

Figure 9:
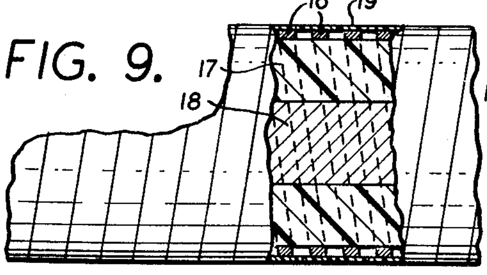
Figure 10:
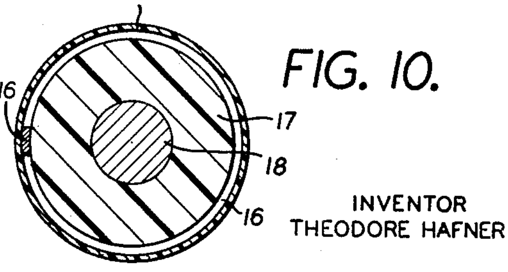

FIGS. 9 and 10 represent the invention as applied to another type of outer conductor.

Figure 11:
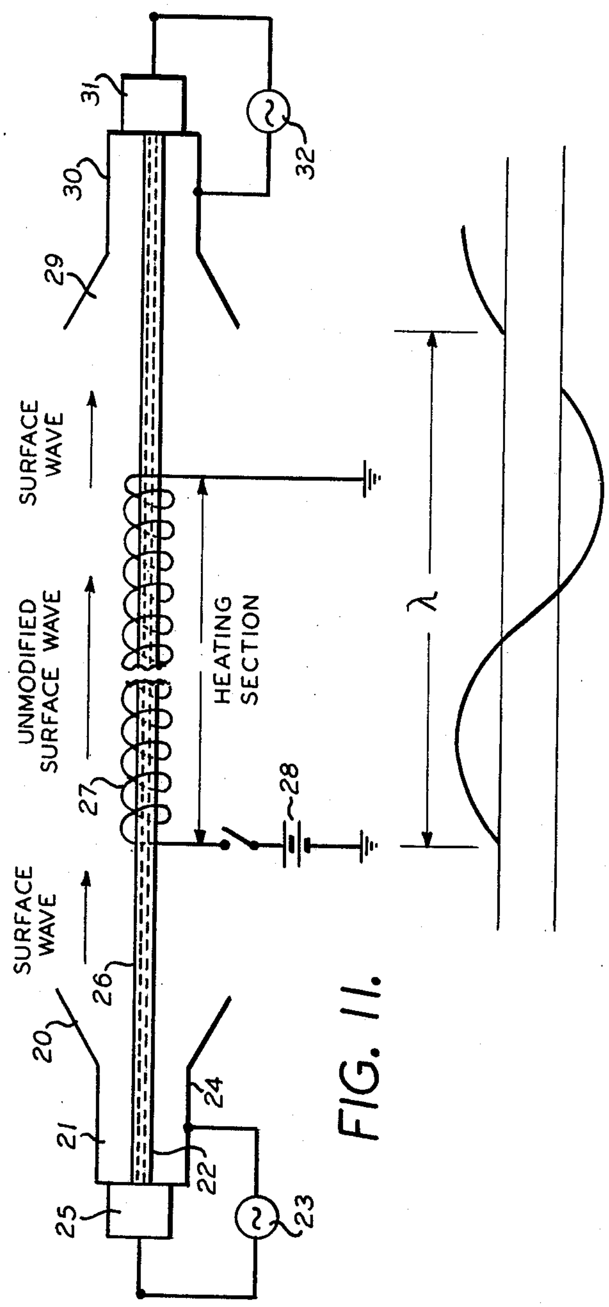

FIG. 11 shows the invention as applied in a surface wave transmission system.

Figure 12:
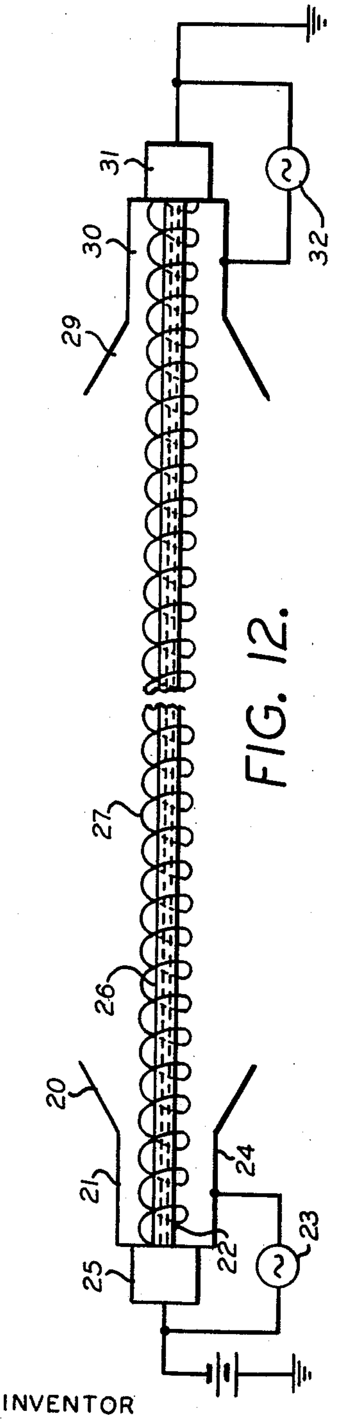

FIG. 12 represents a modification of FIG. 11.

In FIGS. 1 and 2, a surface wave conductor is shown designed especially for a frequency range of around 800 mc. and a bandwidth of at least 200 mc., which however does not prevent its use in other frequency ranges, such as the VHF frequency range from 50 to 250 mc.

The surface wave conductor shown in FIGS. 1 and 2 consists of an inner conductor consisting of pure copper or copperweld or copperply of a relatively large diameter, say 0.162 inch (the copper content being as low as possible compatible with the skin effect at the operating frequency range, say 15%); the conductor itself is indicated at 1 and the dielectric coating at 2, the latter consisting of weather-proof polyethylene 2 or of pure polyethylene provided with a weatherproof outer coating as described in my patent application Serial No. 828,847.

Surface wave conductor 1, 2 is provided with a de-icing coil in the form of a copper wire of 0.0625 diameter (#16) schematically indicated at 3 and wound around dielectric 2 at a pitch of 0.2 inch.

In order to fix the position of wire 3 with respect to coating 2, grooves 4 are cut or moulded into coating 2 permitting fixation of wire spiral 3 in grooves 4.

From experiments underlying the invention, it has been found that the spacing between wire windings 3 for a given diameter of wire 3 must be large enough so as not to interfere with the propagation of the surface wave along surface wave conductor 1, 2 in the operating frequency range. At the same time, of course, wire diameter and winding pitch must be suitable to cause the desired de-icing effect or as the case may be the carrying of the current supply required for any other purpose such as repeater feeding.

In the specific embodiment of a UHF surface wave conductor such as shown in FIGS. 1 and 2 for an operating frequency range of between 400 and 1200 mc. and especially between 700 and 900 mc., and a surface wave conductor of the dimensions indicated above, a diameter for the outer conductor of not more than two-hundredths of a wave length and a pitch of at least one-hundredth of a wave length has been found useful.

There are reasons to believe, however, that these dimensioning rules may be applied generally, especially to frequencies both below and above the UHF range shown above.

In order to improve attachment of the outer wire to the dielectric of the surface wave conductor, this outer wire may be incorporated therein as part of the extrusion process resulting in the modification shown in FIGS. 3 and 4 in which a current supplying wire 5 is shown to be wound moulded into the outer carbon-containing polyethylene layer 6 arranged above a pure polyethylene layer 7 which forms together with layer 6 the surface wave concentration producing dielectric for surface wave conductor 8 as disclosed in my co-pending patent application Serial No. 828,847.

As a specific application of this invention, the heating or current supplying wire spiral can be applied to the dielectric coating whether according to FIGS. 1 and 2 or FIGS. 3 and 4 under tension so as to reduce to a minimum the risk of unwinding or displacement of wire winding which could affect the current supply function, such as de-icing, as well as propagation of the surface wave along the outer space surrounding the conductor spiral. In order further to enhance this attachment under tension the outer spiral may be made to consist of spring wire, for example containing bronze or beryllium or both.

In the embodiment of FIGS. 5 and 6 is shown the application of such a springy outer conductor spiral 9 to the outside of the dielectric 10 of a surface wave conductor 11 and adhering thereto in a predetermined position due to its winding tension combined with the inherent elasticity of the underlying dielectric which may be compressed during winding too, and after application of the wire, add to its fixation by tending to expand to the outside.

The embodiment shown in FIGS. 7 and 8 represents in some respects a modification of the embodiment shown in FIGS. 5 and 6, but it may also be used in combination with any of the modifications shown in FIGS. 1 to 4, respectively.

According to FIGS. 7 and 8 additional fixation of a spiralled wire 12 applied on the outside of a dielectric coating 13 of a surface wave conductor 14 is enhanced by the addition of a thin dielectric coating or layer schematically indicated at 15 whereby the wire may consist of springy or non-springy material and may be arranged in grooves or otherwise at least partly embedded in an outer layer of dielectric 13. In this case the additive dielectric layer 15 is of sufficient thickness as not to affect, or only affect in a predeterminedly desired manner, the surface wave characteristic of surface wave conductor 13, 14.

At the same time layer 15 can be of lossier but more weather resistant material than dielectric 13 which then may consist of pure polyethylene in accordance with my co-pending patent application Serial No. 828,847.

Layer 15 can also be produced if desired by simply winding a very thin dielectric tape, for example Mylar, glued or otherwise fixed to the outside of dielectric coating 13, thereby enhancing the fixation of the conductor spiral 12 in accordance with the invention.

As a further embodiment of the invention shown in FIGS. 9 and 10, the wire spiral may be replaced by another shape of spiral, for example a flat conducting tape or band made of copper or copper bronze such as shown at 16 and applied to the dielectric coating 17 of a surface wave conductor 18 in any of the manners or forms shown in FIGS. 1 to 8, or in any other appropriate form without departing from the scope of this disclosure.

As also shown in FIGS. 9 and 10, the conducting tape spiral 16 can be applied as a spiral layer on a Mylar backing schematically indicated at 19, whereby producing winding and fixation of the conducting spiral with a minimum of operations.

As apparent from FIG. 11 which shows the practical application of the surface wave conductor according to the invention to a surface wave transmission such as disclosed in U.S. 2,685,068 or 2,867,778, operating in the VHF or UHF frequency ranges, respectively.

In FIG. 11 the surface wave transmission consists essentially of a launching device, schematically indicated in FIG. 11 at 20, terminating in a coaxial line indicated at 21, having an inner conductor 22 connected to a signal source 23 at one terminal thereof and an outer conductor 24 connected to the other terminal of signal source 23.

Between coaxial line 21 and signal source 23 there may also be inserted, if desired, a balun 25 transforming the impedance of the coaxial line 21 into an impedance matching the input circuit of signal source 23 and also, if required, to change the coaxial or unbalanced wave into a two-wire or balanced wave.

The surface wave conductor itself schematically indicated in FIG. 11 at 26 is connected with the inner conductor of coaxial line 22 and is of a structure such as indicated in FIGS. 1 through 10 described above.

More specifically, the surface wave conductor 26 in accordance with the invention is shown surrounded by a heating coil schematically indicated at 27, which in turn is connected to a heating current source schematically indicated at 28.

The surface wave conductor itself is further connected to a receiving horn schematically indicated at 29, which in turn is connected through a coaxial line 30 and, if necessary, by another balun 31 to a receiver 32.

As apparent from FIG. 11, the surface wave surrounding surface wave conductor 26 in accordance with the invention is not modified by the heating coil 27 the windings of which are so spaced, relatively narrowly with respect to wave length, so as substantially not to affect the surface wave transmission between launcher 20 and receiver 29.

In accordance with the invention it is of course not necessary to arrange the heating coil 27 over a limited section of surface wave conductor 26 between launcher 20 and receiver 29 but, as apparent from FIG. 12, the conductor 26 may extend toward and within launcher and receiver 20 and 29, respectively, and its end be connected to the inner conductor of coaxial lines 21, 30, or to corresponding elements of baluns 25 and 31, respectively, without departing from the scope of this disclosure.

While the invention has been shown and described with certain types, sizes, structures and relative arrangement conditions and dielectric, the invention is not limited thereto, but may be applied in any appropriate form or manner whatsoever without departing from the scope of this disclosure.

I claim:

1. In a surface wave transmission system, for a predetermined frequency range, a longitudinally extending conducting element having a dielectric coating for maintaining a surface wave at said frequency range, means for launching a surface wave onto said conducting element at one end thereof and means for receiving said surface wave from said conducting element at another end thereof, electric heating means substantially independent from said launching and receiving means and including a further conducting element wound around said dielectric coating for heating the outer surface of said dielectric coating; adjacent windings of said further conducting element being spaced from each other at such a distance small against operating wave length as to permit propagation of said surface wave along the outside of both said further conducting element and said dielectric coating substantially without being affected by said further conducting element.

2. System according to claim 1, wherein said further conducting element consists of a spiral having a pitch of at least one-hundredth and a conductor diameter of not more than two-hundredths of the operating wave length.

3. System according to claim 1, wherein said heating element is in the form of a spiral closely adherent to said dielectric, said dielectric being provided with a groove for receiving said spiral.

4. System according to claim 1, wherein said heating element is in the form of a spiral closely adherent to said dielectric, said outer conductor being moulded into the dielectric.

5. System according to claim 2, wherein said spiral has a pitch of at least twice the thickness of the further conductor.

6. System according to claim 2, wherein said spiral consists of springy material and is applied under tension to the dielectric coating.

7. System according to claim 2, wherein said spiral is attached to the dielectric coating by means of an additional dielectric layer applied to it after winding.

8. System according to claim 2, wherein said spiral is attached to the dielectric coating by means of an additional dielectric layer applied to it after winding, said layer being of lossier but more weather resisting material than the dielectric coating.

9. System according to claim 8, wherein said additional layer is in the form of a tape wound over said spiral, said tape being of lossier but more weather resisting material than the dielectric coating.

10. System according to claim 2, wherein said spiral is in the form of a conducting band applied to the dielectric coating.

11. System according to claim 2, wherein said conducting spiral is in the form of a conducting layer on a dielectric tape base, the latter being wound around the outer surface of the dielectric coating, so as to obtain simultaneously with the winding of this base, the winding of the spiral and its attachment to the dielectric coating, said tape being of lossier but more weather resisting material than the dielectric coating.

No references cited.

HERMAN KARL SAALBACH, *Primary Examiner.*